United States Patent
Yamashita

(10) Patent No.: US 9,822,682 B2
(45) Date of Patent: Nov. 21, 2017

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Yoshio Yamashita, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 225 days.

(21) Appl. No.: 14/874,574

(22) Filed: Oct. 5, 2015

(65) Prior Publication Data
US 2016/0097310 A1    Apr. 7, 2016

(30) Foreign Application Priority Data
Oct. 7, 2014 (JP) ................. 2014-206796

(51) Int. Cl.
*B01D 50/00* (2006.01)
*B01D 49/00* (2006.01)
(Continued)

(52) U.S. Cl.
CPC .......... *F01N 3/025* (2013.01); *F01N 3/027* (2013.01); *F01N 3/106* (2013.01); *F01N 9/002* (2013.01);
(Continued)

(58) Field of Classification Search
CPC .......... F01N 3/025; F01N 3/027; F01N 3/106; F01N 9/002; F01N 2900/1406; F01N 2900/1606; Y02T 10/47
See application file for complete search history.

(56) References Cited

U.S. PATENT DOCUMENTS 5,195,318 A * 3/1993 Shinzawa ............... F01N 3/023
                                                    60/285
2005/0217255 A1* 10/2005 Aratsuka ............. F01N 3/0235
                                                    60/295
(Continued)

FOREIGN PATENT DOCUMENTS

| JP | 2006-057608 A | 3/2006 |
| JP | 2007-032464 A | 2/2007 |
| JP | 5159739 B2 * | 3/2013 |

*Primary Examiner* — Amber R Orlando
(74) *Attorney, Agent, or Firm* — Andrews Kurth Kenyon LLP

(57) ABSTRACT

An exhaust gas purification apparatus for an internal combustion engine, capable of carrying out oxidation removal of PM deposited in a filter as a whole in an efficient manner, includes a filter arranged in an exhaust passage of the internal combustion engine and having an oxidation catalyst supported in at least an upstream side portion thereof, and a heating device arranged so as to be able to heat the upstream side portion of the filter irrespective of oxidation reaction heat of the oxidation catalyst, wherein when filter upstream regeneration processing to oxidize and remove deposition PM in the upstream side portion of the filter is carried out by controlling a heating device, an amount of decrease of the upstream side deposition PM by the filter upstream regeneration processing is reflected on an amount of filter PM deposition in the ordinary filter regeneration processing which oxidizes and removes the deposition PM in the entire filter by means of oxidation reaction heat of unburnt fuel generated by the oxidation catalyst supported in the filter, and the filter upstream regeneration processing is ended, even if the thus reflected amount of filter PM deposition is in a state of being larger than a reference amount of deposition which is a threshold value for ending the ordinary filter regeneration processing.

8 Claims, 11 Drawing Sheets

(51) Int. Cl.
  *B01D 39/00* (2006.01)
  *B01D 41/00* (2006.01)
  *B01D 45/00* (2006.01)
  *B01D 46/00* (2006.01)
  *B01D 51/00* (2006.01)
  *F01N 3/025* (2006.01)
  *F01N 3/10* (2006.01)
  *F01N 9/00* (2006.01)
  *F01N 3/027* (2006.01)
(52) U.S. Cl.
  CPC .............. *F01N 2900/1406* (2013.01); *F01N 2900/1606* (2013.01); *Y02T 10/47* (2013.01)

(56) References Cited

U.S. PATENT DOCUMENTS

| | | | |
|---|---|---|---|
| 2006/0042238 A1 | 3/2006 | Koga et al. | |
| 2013/0074458 A1* | 3/2013 | Haseyama | F01N 3/0253 55/282.3 |
| 2013/0239548 A1* | 9/2013 | Butzke | F01N 3/025 60/274 |
| 2013/0327018 A1* | 12/2013 | Tylutki | F01N 11/00 60/274 |

* cited by examiner

[Fig. 1]
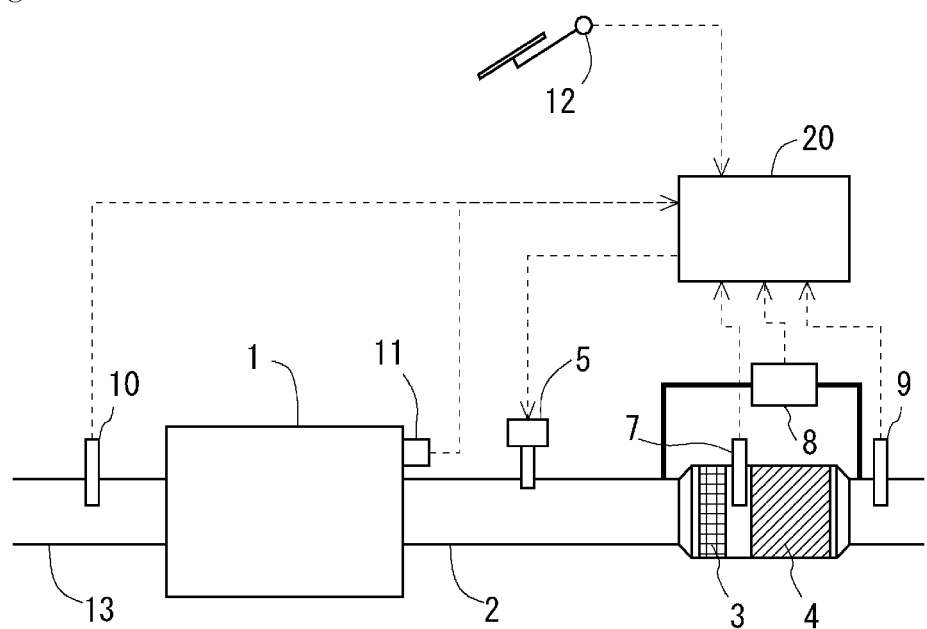

[Fig. 2A]
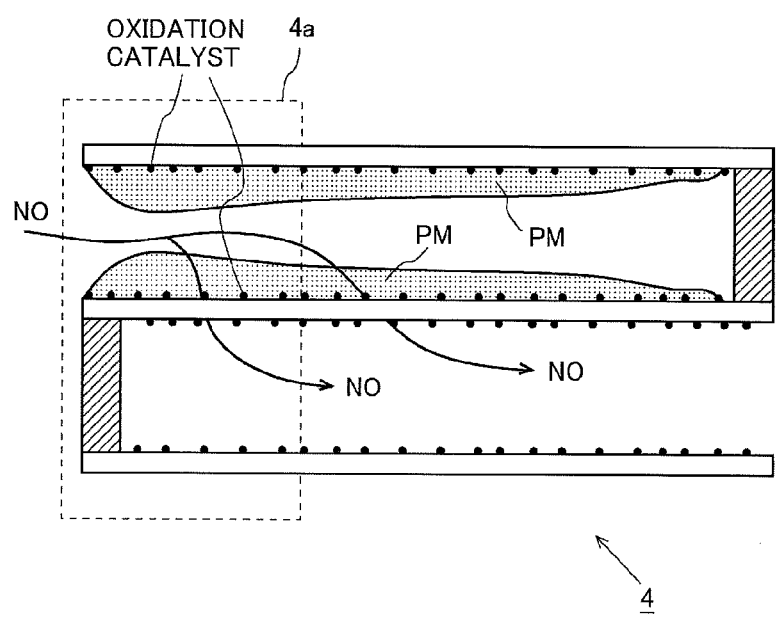
[Fig. 2B]
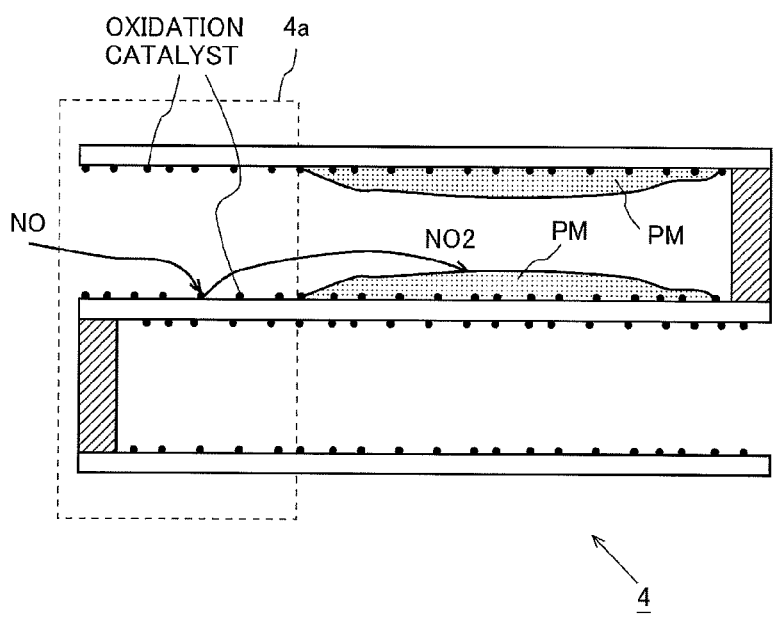

[Fig. 3]
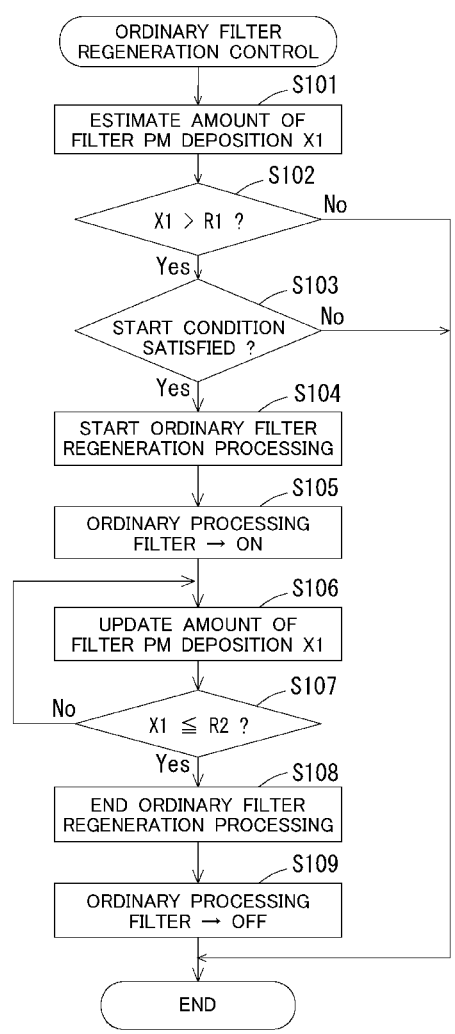

[Fig. 4]
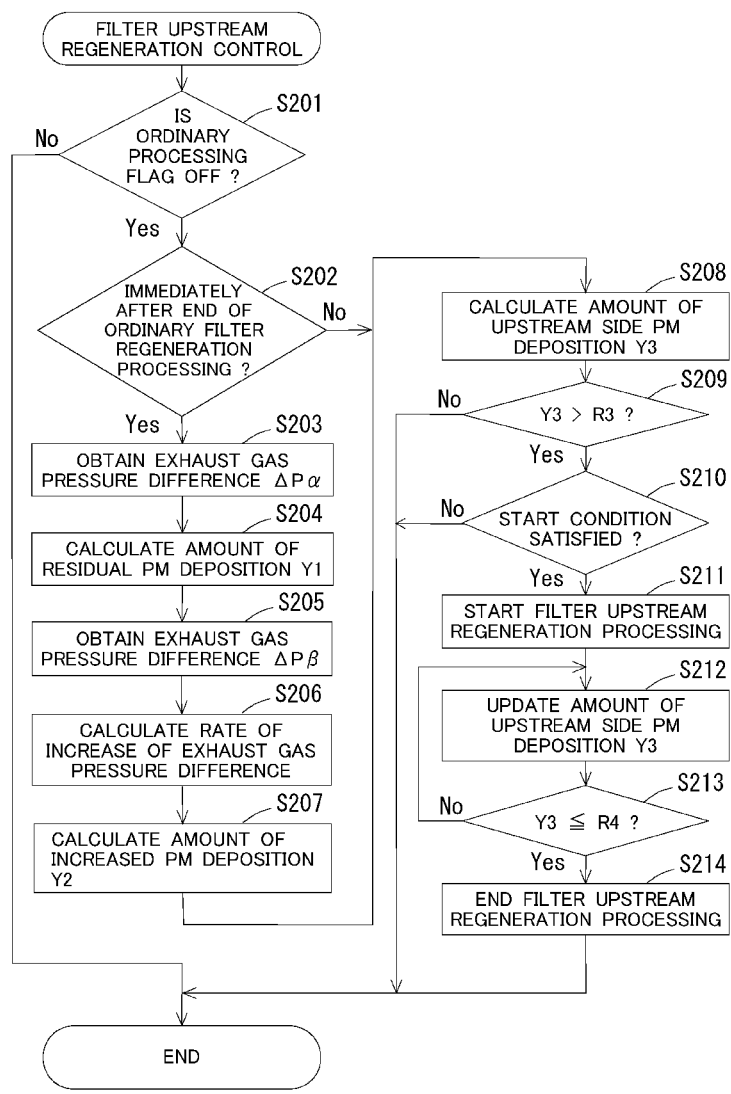

[Fig. 5]
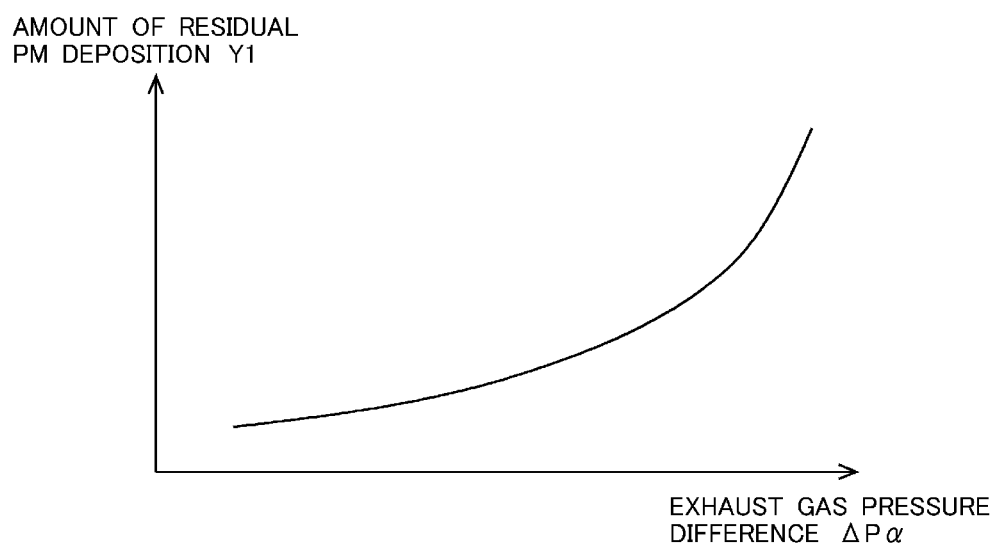

[Fig. 6]
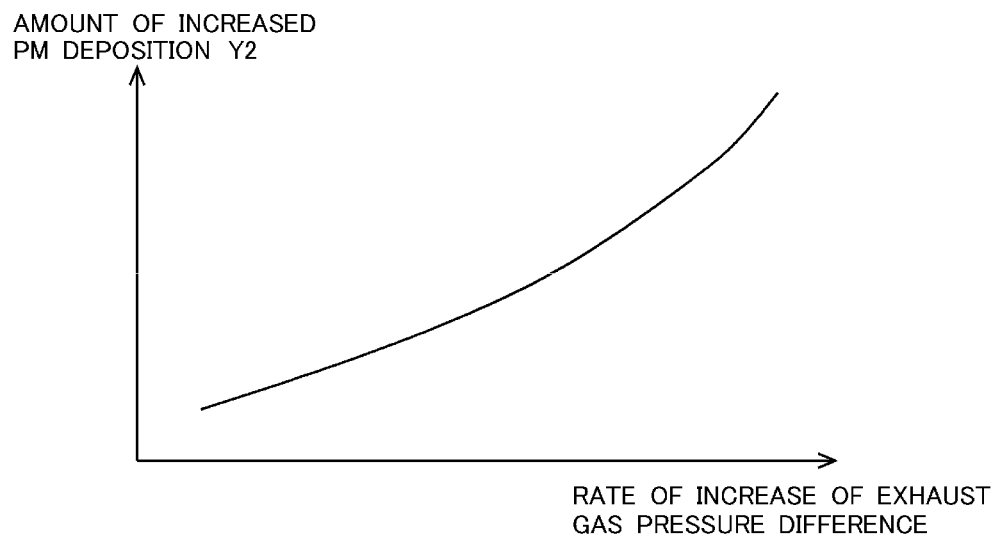

[Fig. 7]
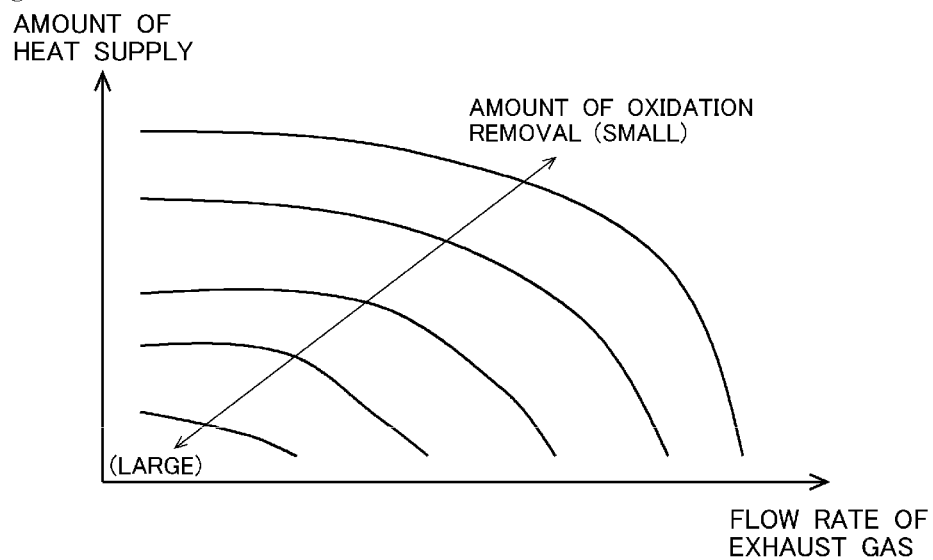

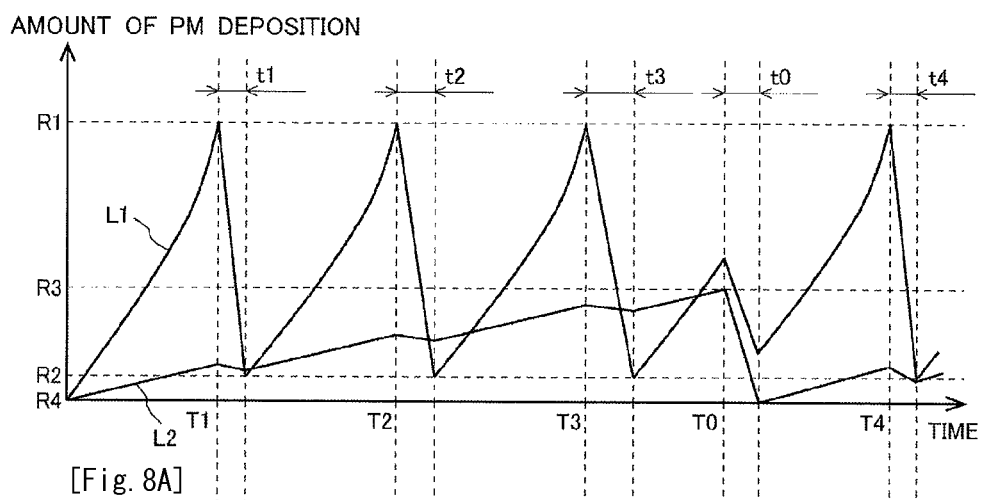
[Fig. 8A]
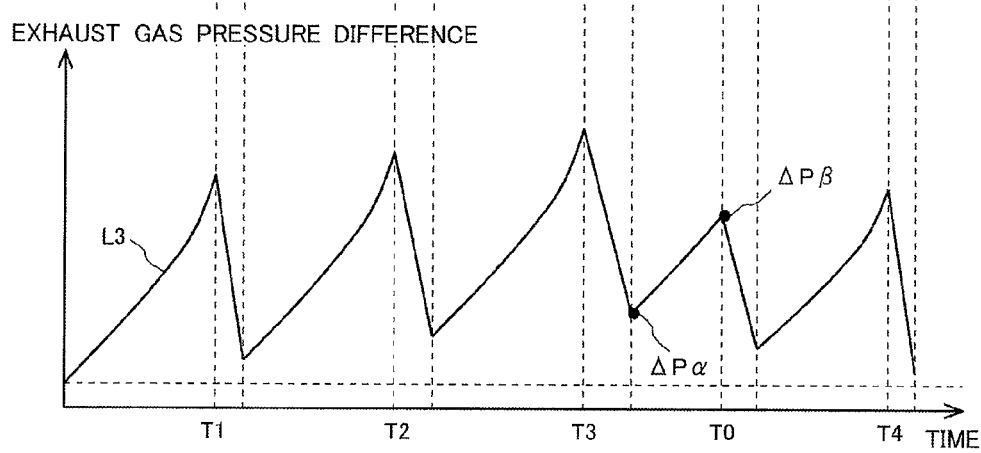
[Fig. 8B]

[Fig. 9]
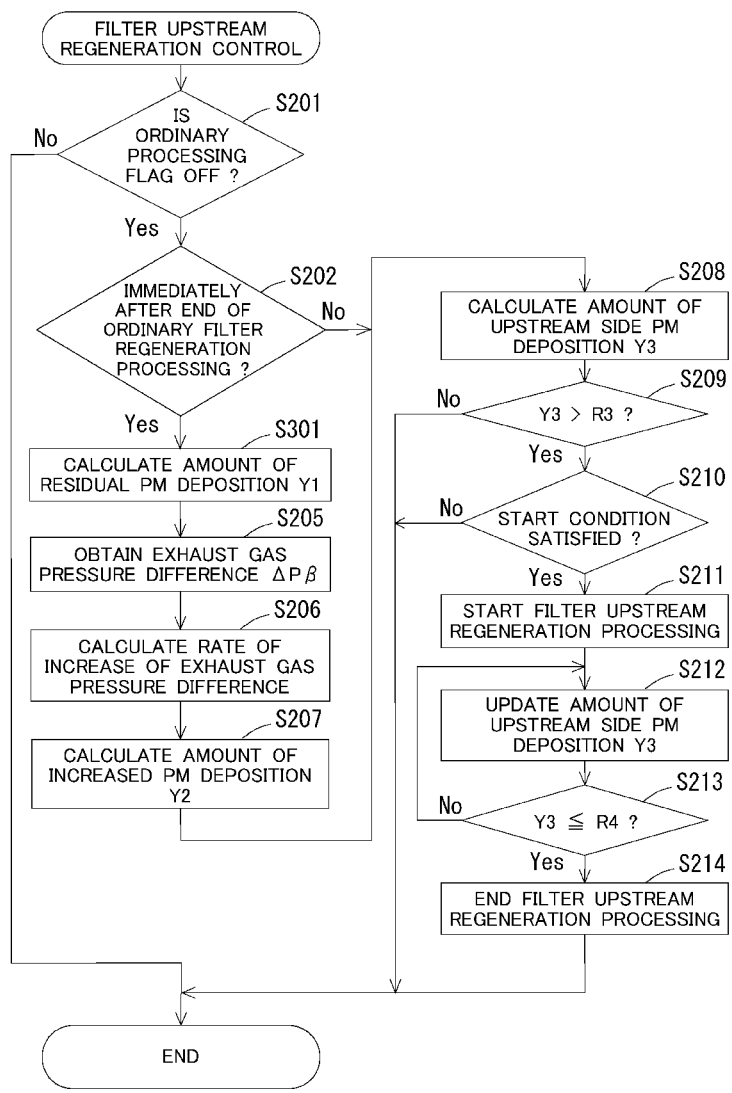

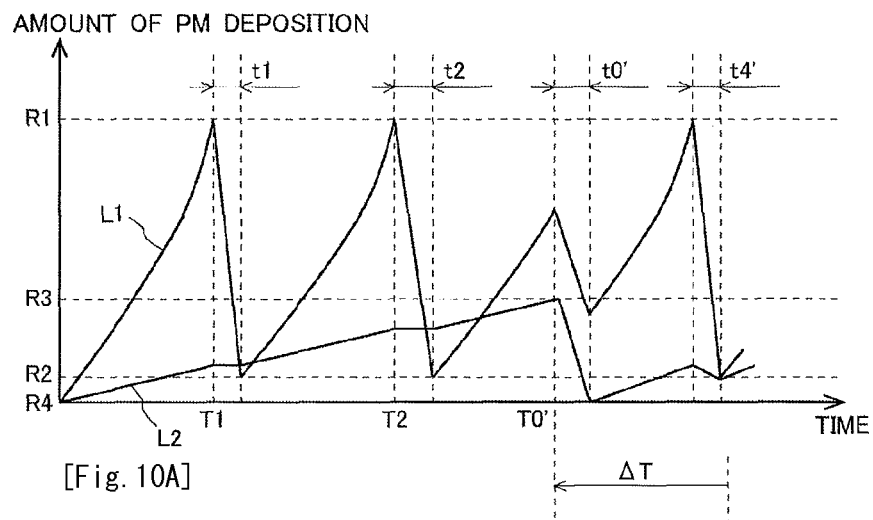
[Fig. 10A]
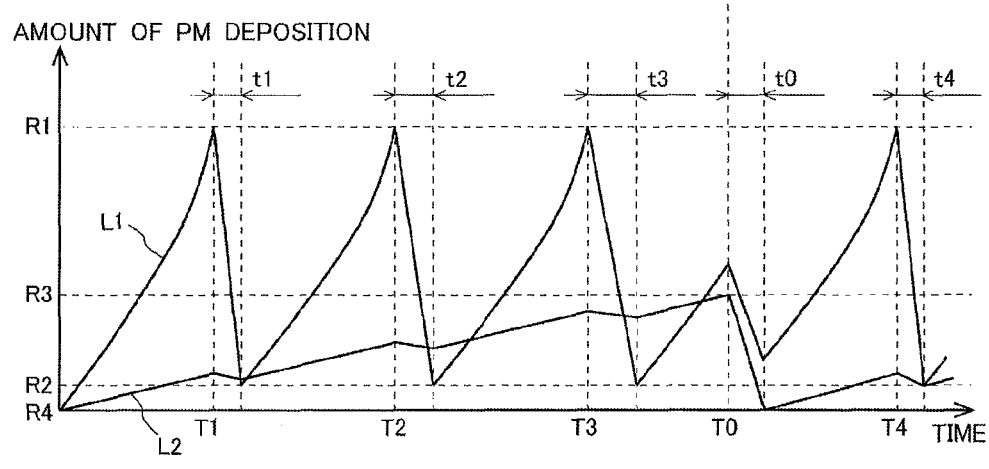
[Fig. 10B]

[Fig. 11]
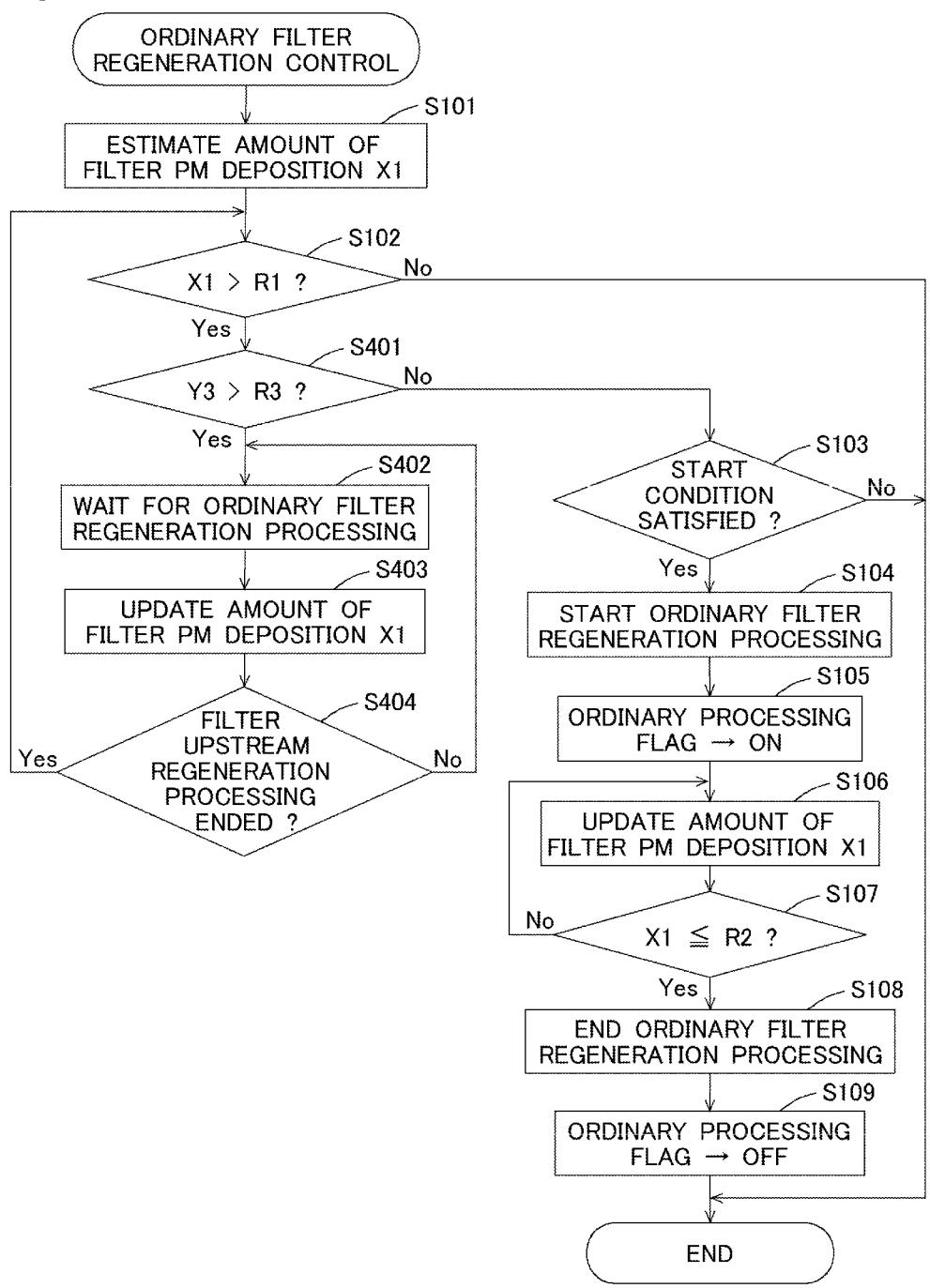

EXHAUST GAS PURIFICATION APPARATUS FOR AN INTERNAL COMBUSTION ENGINE

CROSS-REFERENCE TO RELATED APPLICATION

The present application claims priority to Japanese Patent Application No. 2014-206796 filed on Oct. 7, 2014, which is incorporated herein by reference in its entirety.

BACKGROUND OF THE INVENTION

Technical Field

The present invention relates to an exhaust gas purification apparatus for an internal combustion engine.

Description of the Related Art

In an internal combustion engine, there is arranged a filter which serves to suppress particulate matter (hereinafter, referred to as "PM") in exhaust gas from being released to the outside. As the internal combustion engine operates, the PM in the exhaust gas is trapped by this filter, and deposits thereon gradually. For that reason, filter regeneration processing is carried out in order to prevent the clogging of the filter due to the deposited PM (hereinafter, also referred to as "deposition PM"). This filter regeneration processing is carried out by removing the deposition PM through oxidation, etc. For example, in general, in diesel engines in which the air fuel ratio of exhaust gas is continuously a lean-side air fuel ratio, unburnt fuel is supplied to the exhaust gas, so that the temperature of the exhaust gas is caused to rise by means of an oxidation catalyst arranged in an exhaust passage, etc., thereby performing oxidation removal of the deposition PM.

Here, in general, a filter has a main body portion along the flow of exhaust gas, in which trapping of the PM in the exhaust gas is carried out. However, an upstream side portion of the filter is also a location at which the exhaust gas flows into the filter, so the filter upstream side portion is easy to receive the influence of the exhaust gas flow, and is hard to rise in temperature, whereas a downstream side portion of the filter tends to rise in temperature more easily than the upstream side portion thereof does. As a result, even if the filter regeneration processing is carries out, the deposition PM is liable to remain unburnt in the upstream side portion of the filter. Accordingly, in a first patent literature, there is disclosed a technology in which amounts of PM deposition in two kinds of different filters are estimated, and in cases where a determination is made through a comparison between the amounts of PM deposition in these filters that unburnt PM has occurred in the upstream side portion of the filter, the unburnt PM is caused to burn by making longer the period of time of the filter regeneration processing.

CITATION LIST

Patent Literature

First Patent Literature: Japanese patent laid-open publication No. 2006-57608

SUMMARY OF INVENTION

Technical Problem

As mentioned above, the exhaust gas flows into the upstream portion of the filter, so the temperature of the filter upstream portion becomes difficult to rise, and even if filter regeneration processing is carried out, the deposited PM is liable to remain unburnt in the filter upstream side portion. Thus, in a state where the deposition PM has remained unburnt in the filter upstream side portion, even though the amount of PM deposition in the filter as a whole is small, there is a fear that clogging may occur in the filter due to the deposition PM existing unevenly or locally in the upstream side portion of the filter. Accordingly, when the period of time of the filter regeneration processing is made longer in a state where the amount of PM deposition in the upstream side portion of the filter has become large, as in the conventional technology, the amount of energy required for raising the temperature of the exhaust gas in the regeneration processing increases, thus giving rise to a fear that the fuel economy of the internal combustion engine may be deteriorated.

In addition, the upstream side portion of the filter is a location in which the temperature is originally difficult to rise, and hence, even if the period of time of the filter regeneration processing is made longer, the temperature of the filter upstream side portion can not necessarily be made to rise up to a temperature sufficient to oxidize and remove the deposition PM.

The present invention has been made in view of the problem as mentioned above, and has for its object to provide an exhaust gas purification apparatus for an internal combustion engine which is able to carry out oxidation removal of PM deposited in a filter as a whole in an efficient manner.

Solution to Problem

In the present invention, in order to solve the above-mentioned problem, there is adopted an arrangement in which filter upstream regeneration processing other than oxidation removal processing (ordinary filter regeneration processing) of deposition PM by the control of the air fuel ratio of exhaust gas is carried out by using a heating device which is arranged so as to be able to heat an upstream side portion of a filter in which PM tends to deposit, irrespective of the air fuel ratio of the exhaust gas. Then, the filter upstream regeneration processing is carried out until the amount of PM deposition in the upstream side portion of the filter decreases to a predetermined amount (a fourth amount of deposition), irrespective of the amount of PM deposition of the entire filter.

Specifically, the present invention resides in an exhaust gas purification apparatus for an internal combustion engine which comprises: a filter that is arranged in an exhaust passage of the internal combustion engine for trapping particulate matter in exhaust gas, and has an oxidation catalyst supported in at least an upstream side portion of said filter; and a heating device that is arranged so as to be able to heat said upstream side portion of said filter irrespective of the air fuel ratio of the exhaust gas. In addition, the exhaust gas purification apparatus further comprises: a first estimation unit configured to estimate an amount of filter PM deposition which is an amount of deposition of particulate matter deposited in said filter as a whole; a second estimation unit configured to estimate an amount of upstream side PM deposition which is an amount of deposition of upstream side deposition PM which is particulate matter deposited in said upstream side portion; an ordinary filter regeneration unit configured to carry out ordinary filter regeneration processing to oxidize and remove the particulate matter until said amount of filter PM deposition decreases to a second amount of deposition smaller than a first amount of deposition, by controlling the air fuel ratio of the exhaust gas flowing into said filter, when said amount of filter PM deposition estimated by said first estimation unit exceeds said first amount of deposition; and a filter upstream regeneration unit configured to carry out filter upstream regeneration processing to oxidize and remove said upstream side deposition PM by controlling said heating device, when said amount of upstream side PM deposition estimated by said second estimation unit exceeds a third amount of deposition. Then, when said filter upstream regeneration processing is carried out by said filter upstream regeneration unit, an amount of decrease of said upstream side deposition PM by said filter upstream regeneration processing is reflected on said amount of filter PM deposition estimated by said first estimation unit, and even if the thus reflected amount of filter PM deposition is in a state of being larger than said second amount of deposition, said filter upstream regeneration unit ends said filter upstream regeneration processing, when said amount of upstream side PM deposition reaches a fourth amount of deposition smaller than said third amount of deposition.

In said internal combustion engine, said filter is arranged in the exhaust passage, so that trapping of the PM in the exhaust gas is carried out. Here, said oxidation catalyst is supported in at least a part of the filter upstream side portion, so that it becomes possible to raise the temperature of the filter by oxidizing unburnt fuel in the exhaust gas by means of the oxidation catalyst. Here, note that said upstream side portion is a location of a predetermined range including at least an upstream end face in the filter into which the exhaust gas flows. Accordingly, because the upstream side portion is a portion of the filter which is directly exposed to the flow of the exhaust gas, a tendency is seen that the oxidation reaction heat of the unburnt fuel generated in the upstream side portion is relatively easy to flow to the downstream side thereof, and the temperature of the upstream side portion itself is difficult to go up.

Accordingly, in order to cause the temperature of the upstream side portion of the filter to go up in an effective manner, there is disposed or provided said heating device. This heating device is constructed so as to be able to heat the upstream side portion of the filter according to a heating mode which is other than the oxidation reaction of the unburnt fuel which flows into the filter, while being entrained in the exhaust gas. For such a purpose, for example, there can be adopted a known form of heating device such as a heater or a burner arranged adjacent to and at the upstream side of the upstream end face of the filter, or a heater embedded in the filter, etc. Here, note that even during the heating of the filter upstream side portion by means of the heating device, when unburnt fuel flows into the filter, the oxidation reaction of the unburnt fuel of course occurs. In other words, an expression "irrespective of the oxidation reaction heat of the oxidation catalyst" does not mean a state in which the oxidation reaction of the unburnt fuel in the oxidation catalyst does not occur at all.

In the internal combustion engine having such a filter and a heating device, a control device according to the present invention carries out at least the ordinary filter regeneration processing by the ordinary filter regeneration unit, and the filter upstream regeneration processing by the filter upstream regeneration unit, as regeneration processing for carrying out the oxidation removal of the deposited PM in the filter. The ordinary filter regeneration processing is a kind of regeneration processing which is carried out by making use of the oxidation reaction heat of the unburnt fuel in the exhaust gas by controlling the air fuel ratio of the exhaust gas flowing into the filter, and which is started to be performed when the amount of filter PM deposition, being the amount of the deposition PM in the entire filter, exceeds the first amount of deposition, and is then continued until the amount of filter PM deposition decreases to the second amount of deposition. Accordingly, said first amount of deposition is a threshold value of the amount of filter PM deposition for determining the start of the ordinary filter regeneration processing. When the amount of filter PM deposition in the filter becomes a state where it has exceeded the first amount of deposition, the clogging of the entire filter progresses, and back pressure goes up. In addition, said second amount of deposition is a threshold value of the amount of filter PM deposition for determining the end of the ordinary filter regeneration processing. Here, note that the amount of filter PM deposition is an amount of deposition estimated by the first estimation unit, and it is possible to estimate the amount of filter PM deposition based on, for example, a pressure difference between pressures of the exhaust gas at the upstream side and at the downstream side of the filter, or an operation history of the internal combustion engine, etc.

The ordinary filter regeneration processing is carried out in order to oxidize and remove the deposited PM in the entire filter. Here, a temperature distribution formed in the filter will be affected by the flow of the exhaust gas to a large extent. For that reason, even if the ordinary filter regeneration processing is carried out, the deposition PM may remain in the upstream side portion of the filter, without being oxidized and removed (hereinafter, the deposition PM remaining in the upstream side portion of the filter, even if the ordinary filter regeneration processing is carried out, may be referred to as "residual PM"). As the amount of such deposition PM remaining in the upstream side portion of the filter increases, the oxidation catalyst supported in the upstream side portion will be covered with the deposition PM. As a result, there is a fear that the oxidation ability of the oxidation catalyst in the upstream side portion of the filter may drop to a remarkable extent, and the oxidation removal of the deposition PM by the ordinary filter regeneration processing may take a large period of time. Accordingly, the efficient oxidation removal of the deposition PM in the entire filter will be obstructed. In particular, it is possible to promote the oxidation removal of the deposition PM by oxidizing nitrogen monoxide (NO) in the exhaust gas into nitrogen dioxide (NO2) by means of the oxidation catalyst in the upstream side portion of the filter, but the residual PM in the upstream side portion will also obstruct the oxidation removal of the PM by this oxidation of NO into NO2.

Accordingly, the filter upstream regeneration processing is carried out in order to oxidize and remove this residual PM. This filter upstream regeneration processing is to directly heat the upstream side portion of the filter with heat energy applied from the heating device. For that reason, it is relatively hard to be affected by the influence of the flow of the exhaust gas, so the temperature of the upstream side portion of the filter can be caused to rise in an effective manner, thus making it possible to oxidize and remove the PM deposited there. Specifically, the filter upstream regeneration processing is started to be performed when the amount of upstream side PM deposition exceeds the third amount of deposition, and is then continued until the amount of upstream side PM deposition decreases to the fourth amount of deposition. Said third amount of deposition is a threshold value of the amount of upstream side PM deposition for determining the start of the filter upstream regeneration processing, and it is assumed that when the amount of upstream side PM deposition becomes a state where it has exceeded the third amount of deposition, there has been formed a condition in which the oxidation ability of the oxidation catalyst in the upstream side portion of the filter is not exhibited to a sufficient extent. In addition, said fourth amount of deposition is a threshold value of the amount of upstream side PM deposition for determining the end of the filter upstream regeneration processing. Here, note that said amount of upstream side PM deposition is an amount of deposition estimated by the second estimation unit.

Here, when the filter upstream regeneration processing is carried out, in consideration of the upstream side deposition PM being oxidized and removed, the amount of decrease of the upstream side deposition PM thus oxidized and removed is reflected on the amount of filter PM deposition which is the amount of PM deposition in the entire filter. As a mode of the reflection, there can be mentioned, by way of example, one in which the amount of upstream side PM deposition oxidized and removed is decreased from the amount of filter PM deposition. Here, note that in such a mode of decrease, it is not necessarily required that the amount of upstream side PM deposition oxidized and removed and the amount of decrease of the amount of filter PM deposition be the same with each other, but the reflection should only be carried out by taking account of the technical meanings which the amount of filter PM deposition and the amount of the upstream side deposition PM have, respectively, or the quantitative correlation between them in each regeneration processing. In addition, the amount of upstream side PM deposition and the amount of filter PM deposition may be estimated in units in which they can be directly compared with each other, or may be estimated in different units.

Then, said filter upstream regeneration processing is ended when the amount of upstream side PM deposition reaches the fourth amount of deposition smaller than the third amount of deposition, but at this time, even if the amount of filter PM deposition with the decrease of the amount of upstream side PM deposition reflected thereon is in a state of being larger than the second amount of deposition, i.e., even if the amount of filter PM deposition is in a state of having not reached an end threshold value for ending ordinary filter regeneration processing in the case where the ordinary filter regeneration processing has been carried out, the filter upstream regeneration processing will be ended. If the deposition PM in at least the upstream side portion is oxidized and removed by the filter upstream regeneration processing, the oxidation ability of the oxidation catalyst supported there becomes a state of being able to be exhibited in an effective manner. As a result, efficient generation of the oxidation reaction heat by the unburnt fuel in the exhaust gas and the efficient oxidation of NO in the exhaust gas into NO2 can be achieved, and consequently, the ordinary filter regeneration processing to be performed later will be able to be carried out in an efficient manner. Accordingly, as mentioned above, even if the reflected amount of filter PM deposition is in a state of being larger than the second amount of deposition, by ending the filter upstream regeneration processing, it becomes possible to achieve efficient oxidation removal of the deposition PM, while suppressing the energy required for the regeneration processing of the filter as small as possible, as the entire internal combustion engine.

Here, in said exhaust gas purification apparatus for an internal combustion engine, in cases where said amount of filter PM deposition is in a state of having exceeded said first amount of deposition and said amount of upstream side PM deposition is in a state of having exceeded said third amount of deposition, said filter upstream regeneration processing may be carried out in preference to said ordinary filter regeneration processing. As mentioned above, the state where the oxidation ability of the oxidation catalyst supported in the upstream side portion of the filter is exhibited in an effective manner will be formed by the execution of the filter upstream regeneration processing. Accordingly, in cases where the state where the amount of filter PM deposition has exceeded the first amount of deposition, i.e., the state where the ordinary filter regeneration processing may be started, has been formed, and in cases where the state where the amount of upstream side PM deposition has exceeded the third amount of deposition, i.e., the state where the filter upstream regeneration processing may be started, has been formed, the ordinary filter regeneration processing to be performed later can be carried out in an efficient manner, by preferentially carrying out the filter upstream regeneration processing. Here, note that the amount of upstream side PM deposition oxidized and removed is reflected on the amount of filter PM deposition by the execution of the filter upstream regeneration processing, but in cases where the amount of filter PM deposition still has exceeded the first amount of deposition after the reflection, the ordinary filter regeneration processing may be carried out immediately after the end of the filter upstream regeneration processing, whereas in cases where the amount of filter PM deposition has not exceeded the first amount of deposition after the reflection, the ordinary filter regeneration processing may be carried out, after waiting for an increase in the amount of filter PM deposition in accordance with the subsequent operation of the internal combustion engine. Or, in cases where the amount of filter PM deposition has not exceeded the first amount of deposition after the reflection, too, the ordinary filter regeneration processing may also be carried out immediately after the end of the filter upstream regeneration processing.

Here, in the exhaust gas purification apparatus for an internal combustion engine described up to above, two modes shown below can be mentioned, by way of example, with respect to the estimation of the amount of upstream side PM deposition by the second estimation unit. Here, note that the following description does not prevent the adoption of estimation modes other than the following two examples for the invention of the subject application. First, as a first mode, said second estimation unit may include: a first calculation unit configured to calculate, based on a first exhaust gas pressure difference which is an exhaust gas pressure difference between an upstream side and a downstream side of said filter at an end time point of said ordinary filter regeneration processing by said ordinary filter regeneration unit, an amount of residual PM deposition which is an amount of PM deposition in said filter at said end time point; and a second calculation unit configured to calculate, based on a ratio between said first exhaust gas pressure difference and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

Said first calculation unit calculates, based on the first exhaust gas pressure difference, the amount of PM deposition remaining in said filter at the time when the ordinary filter regeneration processing ends. Because the ordinary filter regeneration processing is to raise the temperature of the filter by controlling the air fuel ratio of the exhaust gas flowing into the filter, there is a high possibility that the deposition PM remains in the upstream side portion of the filter in which the temperature is relatively difficult to go up. Accordingly, the amount of residual PM deposition calculated by the first calculation unit can be considered to be the amount of deposition PM remaining in the upstream side portion of the filter at the end time point of the ordinary filter regeneration processing. Then, the second calculation unit calculates the amount of PM deposition depositing in the upstream side portion of the filter in accordance with the lapse of time from the end of the ordinary filter regeneration processing. Here, the present inventor has found that the amount of PM deposition depositing in the upstream side portion of the filter in accordance with the lapse of time in this manner has a predetermined correlation with a ratio between the first exhaust gas pressure difference and an amount of increase of the exhaust gas pressure difference in the elapsed period of time, i.e., a rate of increase of the exhaust gas pressure difference in the filter after the end of the ordinary filter regeneration processing. Accordingly, the second calculation unit calculates the amount of increase of the amount of upstream side PM deposition in the elapsed period of time according to this predetermined correlation. Further, the second calculation unit is to calculate and estimate a final amount of upstream side PM deposition by adding this amount of increase of the amount of upstream side PM deposition to the amount of residual PM deposition calculated by the first calculation unit.

Second, as a second mode, said second estimation unit may include: a first calculation configured to calculate said amount of upstream side PM deposition immediately before the start of said ordinary filter regeneration processing, as the amount of residual PM deposition which is the amount of PM deposition in the filter at the end time point of said ordinary filter regeneration processing, in cases where said ordinary filter regeneration processing is carried out by said ordinary filter regeneration unit; and a second calculation unit configured to calculate, based on a ratio between said first exhaust gas pressure difference and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

The first calculation unit in this second mode uses the amount of upstream side PM deposition immediately before the start of the ordinary filter regeneration processing as the amount of residual PM deposition. That is, the first calculation unit calculates the amount of residual PM deposition according to an assumption that in the ordinary filter regeneration processing, the upstream side deposition PM remains as it is, without being oxidized and removed. Here, note that with respect to this second calculation unit, it is the same as the aforementioned second calculation unit in the first mode. Accordingly, in the second mode, the estimated value of the amount of upstream side PM deposition is easier to increase, and the frequency of the execution of the filter upstream regeneration processing becomes higher, in comparison with the first mode. As a result, although the energy consumption in the heating device used in the filter upstream regeneration processing becomes large, the state where the oxidation ability of the oxidation catalyst in the upstream side portion of the filter is exhibited in a suitable manner can be formed at a frequency as high as possible, and it can be said from this point of view, too, that it becomes possible to carry out oxidation removal of the deposition PM in the entire filter in an efficient manner.

In the exhaust gas purification apparatus for an internal combustion engine described up to above, said fourth amount of deposition may be set to zero. With this, when the filter upstream regeneration processing has been carried out, the amount of PM deposition deposited in the upstream side portion of the filter has become as small as possible, thus making it possible to exhibit the oxidation ability of the oxidation catalyst in the upstream side portion of the catalyst to a maximum extent.

Advantageous Effects of Invention

According to the present invention, it becomes possible to provide an exhaust gas purification apparatus for an internal combustion engine which is able to carry out oxidation removal of deposition PM in an entire filter in an efficient manner.

Further features of the present invention will become apparent from the following description of exemplary embodiments with reference to the attached drawings.

BRIEF DESCRIPTION OF DRAWINGS

FIG. 1 is a view showing the schematic construction of an exhaust gas purification apparatus for an internal combustion engine according to the present invention.

FIGS. 2A and 2B are views respectively showing different oxidation conditions of deposition PM and NO in a filter provided in the exhaust gas purification apparatus for an internal combustion engine shown in FIG. 1.

FIG. 3 is a first flow chart with respect to ordinary filter regeneration control carried out by the exhaust gas purification apparatus for an internal combustion engine according to the present invention.

FIG. 4 is a first flow chart with respect to filter upstream regeneration control carried out by the exhaust gas purification apparatus for an internal combustion engine according to the present invention.

FIG. 5 is a view showing a control map for calculating an amount of residual PM deposition in the filter upstream regeneration control shown in FIG. 4.

FIG. 6 is a view showing a control map for calculating an amount of increased PM deposition in the filter upstream regeneration control shown in FIG. 4.

FIG. 7 is a view showing a control map for controlling a heater for oxidizing and removing the deposition PM in an upstream side portion of the filter in the filter upstream regeneration control shown in FIG. 4.

FIGS. 8A and 8B are time charts showing the changes over time of an amount of PM deposition in the filter and an exhaust gas pressure difference in the filter, respectively, when the ordinary filter regeneration control shown in FIG. 3 and the filter upstream regeneration control shown in FIG. 4 are carried out.

FIG. 9 is a second flow chart with respect to filter upstream regeneration control carried out by the exhaust gas purification apparatus for an internal combustion engine according to the present invention.

FIGS. 10A and 10B are time charts showing the changes over time of the amount of PM deposition in the filter, when the ordinary filter regeneration control shown in FIG. 3 and the filter upstream regeneration control shown in FIG. 9 are carried out, respectively.

FIG. 11 is a second flow chart with respect to ordinary filter regeneration control carried out by the exhaust gas purification apparatus for an internal combustion engine according to the present invention.

DESCRIPTION OF EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

FIG. 1 is a view showing the schematic construction of an exhaust gas purification apparatus for an internal combustion engine 1 according to a first embodiment of the present invention. The internal combustion engine 1 is a diesel engine for driving a vehicle. An exhaust passage 2 is connected to the internal combustion engine 1. In the exhaust passage 2, there is arranged a particulate filter 4 (hereinafter, simply referred to as a "filter") for trapping particulate matter (PM) in exhaust gas. This filter 4 is a wall flow type filter, with an oxidation catalyst being supported by its substrate. Here, note that the detailed structure of the filter 4 will be described later according to FIGS. 2A and 2B. In addition, a heater 3 is disposed in the exhaust passage 2 at the upstream side of the filter 4 in a manner so as to be generally adjacent to an upstream end face of the filter 4. This heater 3 is constructed so as to be able to heat the upstream end face of the filter 4 irrespective of the air fuel ratio in the exhaust gas discharged from the internal combustion engine, and specifically, the heater 3 can heat the upstream end face of the filter 4 by electric power supplied from an external power supply. Here, note that although the heater 3 is disposed at the upstream side of the filter 4, the shape and the position of arrangement thereof are adjusted so as not to obstruct the inflow of the exhaust gas to the filter 4.

Then, a fuel supply valve 5 for supplying fuel (unburnt fuel) to the exhaust gas flowing into the filter 4 is arranged at the upstream side of the heater 3. In addition, a temperature sensor 7 is arranged in a position able to detect the temperature of the exhaust gas flowing into the filter 4, i.e., in the exhaust passage 2 at a location between the heater 3 and the filter 4, and a second temperature sensor 9 is disposed for detecting the temperature of the exhaust gas flowing through the exhaust passage 2 at the downstream side of the catalyst 4. Further, a differential pressure sensor 8 is also arranged for detecting a difference in the pressure of the exhaust gas in the exhaust passage 2 between the upstream side and the downstream side across the filter 4.

In addition, in an intake passage 13 of the internal combustion engine 1, there is disposed an air flow meter 10 which is able to measure an amount of intake air flowing through the intake passage 13. Then, an electronic control unit (ECU) 20 is provided in combination with the internal combustion engine 1, and this ECU 20 is a unit that controls the operating state of the internal combustion engine 1, and so on. The aforementioned fuel supply valve 5, the temperature sensors 7, 9, the differential pressure sensor 8, the air flow meter 10, a crank position sensor 11, an accelerator opening sensor 12 and so on are electrically connected to the ECU 20. The fuel supply valve 5 carries out fuel supply control to supply fuel to the exhaust gas according to an instruction from the ECU 20, and detection values obtained by the individual sensors are passed to the ECU 20. For example, the crank position sensor 11 detects the crank angle of the internal combustion engine 1, and the accelerator opening sensor 12 detects the opening degree of an accelerator of a vehicle carrying thereon the internal combustion engine 1, so that they send the detection values thus obtained to the ECU 20. As a result, the ECU 20 derives an engine rotational speed of the internal combustion engine 1 based on the detection value of the crank position sensor 11, and also derives an engine load of the internal combustion engine 1 based on the detection value of the accelerator opening sensor 12. In addition, the ECU 20 can detect the temperature of the exhaust gas flowing into the filter 4 based on the detection value of the temperature sensor 7, and can estimate the temperature of the filter 4 based on the detection value of the exhaust gas temperature sensor 9. Moreover, the ECU 20 can grasp the deposition condition of PM in the filter 4 based on the detection value of the differential pressure sensor 8, and the processing thereof will be described later.

In the exhaust gas purification apparatus for the internal combustion engine 1 constructed as mentioned above, in general, the PM (particulate matter) contained in the exhaust gas is trapped by the filter 4, thus suppressing the release of the PM to the outside. In addition, a catalyst for the purification of exhaust gas (i.e., a catalyst for the reduction of nitrogen oxides (NOx), etc.), which is not illustrated, may be provided. Here, the trapping of PM in the filter 4 will be explained, based on FIGS. 2A and 2B. As shown in FIGS. 2A and 2B, the filter 4 is a wall flow type filter, and the left side in FIGS. 2A and 2B is an end face into which the exhaust gas flows, i.e., an upstream end face side. In addition, on the substrate of the filter 4, the oxidation catalyst such as, for example, platinum group metals (PGM) having oxidation ability is supported, and is indicated by black dots on or in the substrate in FIGS. 2A and 2B. The oxidation catalyst is supported or carried on a filter inner wall surface, ranging from an upstream side to a downstream side of the interior thereof, as shown in FIGS. 2A and 2B. The oxidation ability of this oxidation catalyst enables to oxidize the unburnt fuel and NO in the exhaust gas. Here, note that when NO is oxidized into $NO_2$, it becomes possible to promote the oxidation removal of the PM deposited in the filter 4 by the oxidation ability of $NO_2$ itself.

Here, FIG. 2A shows a state in which the exhaust gas containing PM has flowed into the filter 4, and the PM has deposited in the filter 4. In this state of deposition, the PM is in a state of having deposited ranging from the upstream side to the downstream side of the filter inner wall surface. Then, when the PM deposits up to a limit deposition amount in the filter 4, back pressure in the exhaust passage 2 rises, so the PM deposited in the filter 4 is oxidized and removed due to a rise in the temperature of the filter 4. The processing for eliminating the rise of the back pressure is referred to as "ordinary filter regeneration processing" in this description. Specifically, in the ordinary filter regeneration processing, a predetermined amount of fuel is supplied into the exhaust gas from the fuel supply valve 5, and is burned by the oxidation catalyst supported in the filter 4, whereby the temperature of the filter 4 is caused to rise, and oxidation removal of the PM deposited in the filter 4 is thereby carried out.

Here, NO is contained in the exhaust gas. This NO by itself is relatively weak in its oxidizing power, but when the NO is oxidized into NO2 by the oxidation catalyst, the NO2 thus generated will have such a degree of oxidizing power as to be able to oxidize and remove the PM deposited in the filter 4. Accordingly, when oxidizing and removing the PM deposited in the filter 4, it becomes possible to perform efficient oxidation removal of the deposition PM by using the oxidizing power of NO2 other than the oxidation reaction heat of unburnt fuel. However, in the state of the deposition shown in FIG. 2A, the supported or carried oxidation catalyst is covered with the deposition PM, NO2 can not be generated in an efficient manner, and as a result, the efficient oxidation removal of the deposition PM in the filter 4 as a whole becomes difficult.

Accordingly, standing on the point of view of the efficient oxidation removal of the deposition PM, it is preferable that the PM deposition be in a state as shown in FIG. 2B, i.e., a state in which the deposition PM is oxidized and removed in an upstream side portion 4a of the filter 4 including the upstream end face thereof, so that the opportunity of contact between the oxidation catalyst supported or carried in the filter 4 and NO can be secured to some extent. If such a state of PM deposition is formed, the oxidation removal of the PM deposited there can be promoted by conducting the oxidation reaction heat, in the upstream side portion 4a, of the unburnt fuel supplied from the fuel supply valve 5 to the downstream side. In addition, when NO in the exhaust gas is oxidized into NO2 by means of the oxidation catalyst in the upstream side portion 4a of the filter 4, the NO2 thus generated can be supplied to the PM deposited at the downstream side of the upstream side portion 4a of the filter 4, thus making it possible to use the NO2 for the oxidation removal of the PM in an effective manner.

However, the upstream side portion 4a of the filter 4, being a region including the upstream end face thereof, is extremely easy to be affected by the influence of the flow of the exhaust gas, and hence, even if unburnt fuel is supplied from the fuel supply valve 5 according to the ordinary filter regeneration processing and is oxidized by the oxidation catalyst carried in the upstream side portion 4a, the oxidation reaction heat generated thereby is easy to move to the downstream side by the flow of the exhaust gas, and it is difficult to raise the temperature of the upstream side portion 4a itself to a temperature at which the deposition PM can be oxidized and removed. Accordingly, even if the ordinary filter regeneration processing is carried out, the deposition PM is easy to remain unburnt in the upstream side portion 4a, and it is extremely difficult to form a PM deposition state shown in FIG. 2B in which the above-mentioned efficient oxidation removal of the deposition PM is expected.

Accordingly, in the exhaust gas purification apparatus for an internal combustion engine 1 according to the present invention, achievement of the efficient oxidation removal of the deposition PM is attained by carrying out individual regeneration controls of the filter 4 shown in FIG. 3 and FIG. 4. These regeneration controls are each carried out repeatedly at a predetermined interval by executing a predetermined control program in the ECU 20. In addition, the ordinary filter regeneration control shown in FIG. 3 and the filter upstream regeneration control shown in FIG. 4 are repeatedly carried out in parallel with each other, respectively, but both regeneration controls are related to each other in a fixed range, as will be described later.

First, the ordinary filter regeneration control carried out in the exhaust gas purification apparatus for the internal combustion engine 1 will be explained, based on FIG. 3. The ordinary filter regeneration control is intended to raise the temperature of the filter 4, by controlling the air fuel ratio of the exhaust gas flowing into the filter 4, i.e., through supply control of the unburnt fuel from the fuel supply valve 5, thereby performing the ordinary regeneration processing to carry out oxidation removal of the PM deposited there. Here, note that the ordinary filter regeneration processing may be carried out by adjusting the operating condition of the internal combustion engine 1 thereby to control the air fuel ratio of the exhaust gas. First, in step S101, an amount of filter PM deposition X1, which is an amount of PM deposited on the filter 4 as a whole, is estimated based on an amount of PM in the exhaust gas discharged from the internal combustion engine 1. Here, note that this amount of PM discharge from the internal combustion engine 1 is an integrated value of the amount of PM discharged after the latest ordinary filter regeneration processing ends. Specifically, the amount of PM in the exhaust gas at the current point in time is calculated based on the engine rotation speed of the internal combustion engine 1 detected by the crank position sensor 11, and the engine load of the internal combustion engine 1 (or the amount of fuel injection in the internal combustion engine 1) detected by the accelerator opening sensor 12. Here, note that the correlation among the engine rotation speed, the engine load, and the amount of PM has been measured through experiments or the like in advance, and the correlation thus obtained has been stored in the memory in the ECU 20 in the form of a control map, so that the above calculation is carried out through access to the control map. The amount of PM discharge is obtained by integrating this amount of PM thus calculated. Further, note that the amount of PM in the exhaust gas is dependent on the amount of intake air in each combustion chamber of the internal combustion engine 1, so the amount of PM discharge may also be obtained by correcting the above-mentioned calculated amount of PM discharge based on the amount of intake air measured by the air flow meter 10, and integrating the amount of PM discharge thus corrected. Then, the amount of filter PM deposition X1, which has finally deposited in the filter 4, is calculated by multiplying a predetermined trapping rate of the PM trapped by the filter 4 to the amount of PM discharge.

In addition, in step S101, in cases where the deposition PM on the filter 4 is oxidized and removed by the filter upstream regeneration processing to be described later at the time of estimation of the amount of filter PM deposition X1, a reflection of the amount of PM by the oxidation removal (hereinafter, referred to as a "reflection of the regeneration of the upstream side portion") is also carried out. Although described later in detail, when the filter upstream regeneration processing (i.e., processing in step S211 to be described later) is carried out in the filter upstream regeneration control, the deposition PM in the upstream side portion 4a is oxidized and removed. Then, as the reflection of the regeneration of the upstream side portion in step S101, an amount corresponding to the amount of deposition PM thus oxidized and removed will be adjusted to decrease from the amount of filter PM deposition X1. The processing of step S101 as mentioned above corresponds to processing by a first estimation unit according to the present invention. After the processing of step S101 ends, the control flow or routine goes to step S102.

In step S102, it is determined whether the amount of filter PM deposition X1 estimated in step S101 has exceeded a reference amount of PM deposition R1 (corresponding to a first amount of deposition according to the present invention). The reference amount of PM deposition R1 is a threshold value for determining whether the ordinary filter regeneration processing (processing in step S104) to be described later is to be carried out in which unburnt fuel is supplied from the fuel supply valve 5 for the oxidation removal of the deposition PM. Then, when an affirmative determination is made in step S102, the routine goes to step S103, whereas when a negative determination is made, this control is ended.

Moreover, in step S103, it is determined whether a start condition for starting the ordinary filter regeneration processing in step S104 is satisfied. Specifically, as such a start condition, there is mentioned by way of example a case where the temperature of the exhaust gas flowing into the filter 4 is equal to or higher than a predetermined temperature which is high to such an extent that the efficient oxidation removal of the deposition PM is not obstructed. Here, note that the detection value by the temperature sensor 7 can be used as the temperature of the exhaust gas flowing into the filter 4. Accordingly, when an affirmative determination is made in step S103, the routine goes to step S104, whereas when a negative determination is made, this control is ended.

Subsequently, in step S104, the ordinary filter regeneration processing is started to be carried out. Specifically, the supply of the unburnt fuel is carried out from the fuel supply valve 5 so that the temperature of the filter 4 becomes a temperature (hereinafter, referred to as an "oxidation removal temperature") suitable for the oxidation removal of the deposition PM. That is, this processing is for the oxidation removal of the deposition PM carried out by controlling the air fuel ratio of the exhaust gas flowing into the filter 4, and corresponds to processing by the ordinary filter regeneration unit according to the present invention. Here, note that the temperature of the filter 4 can be grasped by using the detection value of the temperature sensor 9. When the processing of step S104 ends, an ordinary processing flag is turn on. This ordinary processing flag is a flag for indicating that the ordinary filter regeneration processing is carried out in the exhaust gas purification apparatus for the internal combustion engine 1 according to the present invention.

Then, in step S106, the amount of filter PM deposition X1 is updated under the condition that the ordinary filter regeneration processing is carried out. An amount of decrease (an amount of oxidation removal) per unit time of the deposition PM in the filter 4 at the time of execution of the ordinary filter regeneration processing changes according to the temperature of the filter 4. Accordingly, an amount of PM, which is able to be oxidized and removed per unit time according to the temperature of the filter 4, has been obtained through experiments or the like in advance, and an amount of decrease of the deposition PM after the ordinary filter regeneration processing is started is calculated based on the amount of PM able to be removed per unit time (hereinafter, referred to as the "amount of PM removal") and the duration of time in which this temperature continues, so that the amount of filter PM deposition X1 is updated with the amount of decrease of the deposition PM thus calculated. After the processing of step S106 ends, the routine goes to step S107.

In step S107, it is determined whether the amount of filter PM deposition X1 updated in step S106 is equal to or less than a reference amount of PM deposition R2 (corresponding to a second amount of deposition according to the present invention). The reference amount of PM deposition R2 is a threshold value for determining the end of the ordinary filter regeneration processing (the processing in step S104). Then, when an affirmative determination is made in step S107, the routine goes to step S108, whereas when a negative determination is made, the routine returns to step S106, and the processings in step S106 and onward are repeated again. Subsequently, in step S108, the ordinary filter regeneration processing, i.e., the supply of the unburnt fuel from the fuel supply valve 5, is ended, and in step S109, the ordinary processing flag is turned off.

Next, the filter upstream regeneration control carried out in the exhaust gas purification apparatus for the internal combustion engine 1 will be explained, based on FIG. 4. This filter upstream regeneration control is control processing in which the temperature of the upstream side portion 4a of the filter 4 is intended to be raised thereby to carry out oxidation removal of the PM deposited in the upstream side portion 4a, irrespective of the air fuel ratio of the exhaust gas, by controlling the heating from the heater 3, unlike the above-mentioned ordinary filter regeneration control. That is, the filter upstream regeneration control is control processing to carry out the oxidation removal of the deposition PM, in order to form the PM deposition state shown in FIG. 2B.

First, in step S201, it is determined whether the ordinary processing flag used in the above-mentioned ordinary filter regeneration control is off. That is, in step S201, it is determined whether the ordinary filter regeneration processing is being carried out. In cases where an affirmative determination is made in step S201 and the ordinary filter regeneration processing is not carried out, the routine goes to step S202. On the other hand, in cases where a negative determination is made in step S201 and the ordinary filter regeneration processing is carried out, the filter upstream regeneration control is ended.

Then, in step S202, it is determined whether it is immediately after the end of the ordinary filter regeneration processing. Specifically, in cases where the value of the amount of filter PM deposition X1 in the ordinary filter regeneration processing is equal to or less than the above-mentioned reference amount of PM deposition R2, a determination can be made that it is in the state immediately after the end of the ordinary filter regeneration processing, i.e., an affirmative determination can be carried out. In addition, as an alternate, in cases where the processings in steps S203, S204 to be described later have not been carried out even once after the ordinary filter regeneration processing ends in the ordinary filter regeneration control and the ordinary processing flag is turned off, a determination may be made that it is in the state immediately after the end of the ordinary filter regeneration processing. When an affirmative determination is made in step S202, the routine goes to step S203, whereas when a negative determination is made, the routine goes to step S205.

In step S203, a difference in pressure of the exhaust gas (hereinafter, referred to simply as an "exhaust gas pressure difference") $\Delta P\alpha$ between the upstream side and the downstream side of the filter 4 at that point in time is obtained. Here, note that the differential pressure sensor 8 is used for obtaining the exhaust gas pressure difference. In addition, the exhaust gas pressure difference $\Delta P\alpha$ corresponds to a first exhaust gas pressure difference according to the present invention. Then, in step S204, an amount of residual PM deposition Y1, which is an amount of deposition of PM remaining in the filter 4 at that point in time, is calculated based on the exhaust gas pressure difference $\Delta P\alpha$ obtained in step S203. The processings of steps S203, S204 are carried out immediately after the end of the ordinary filter regeneration processing, and hence, it is considered that the PM remaining in the filter 4 at that point in time mostly remains in the upstream side portion 4a. As mentioned above, this is because in cases where the ordinary filter regeneration processing is carried out, the temperature of the upstream side portion 4a is placed in a condition that it is difficult to go up. Accordingly, it can be assumed that the amount of residual PM deposition Y1 is an amount of deposition of PM remaining in the upstream side portion 4a immediately after the end of the ordinary filter regeneration processing.

Here, a calculation procedure of the amount of residual PM deposition Y1 will be explained based on FIG. 5. FIG. 5 shows a control map for calculating the amount of residual PM deposition Y1, wherein the correlation between the exhaust gas pressure difference $\Delta P\alpha$ and the amount of residual PM deposition Y1 is recorded in the map. As an example of this correlation, there can be exemplified a mode in which the amount of residual PM deposition Y1 increases, as the exhaust gas pressure difference $\Delta P\alpha$ becomes larger. Accordingly, in step S204, the amount of residual PM deposition Y1 is calculated by using this correlation shown in FIG. 5. After the processing of step S204 ends, the routine goes to step S205.

Subsequently, in step S205, an exhaust gas pressure difference $\Delta P\beta$ of the filter 4 at that point in time is obtained, and then, in step S206, based on the exhaust gas pressure difference $\Delta P\beta$, the rate of increase of the exhaust gas pressure difference after the end of the ordinary filter regeneration processing (corresponding to "a ratio between the first exhaust gas pressure difference, and the amount of increase of the exhaust gas pressure difference between the upstream side and the downstream side of the filter from the end time point of the ordinary filter regeneration processing and of a downstream side" according to the present invention) is calculated according to the following expression 1.

Rate of increase=$(\Delta P\beta - \Delta P\alpha)/\Delta P\alpha$   (Expression 1)

As mentioned above, expression 1 above is an index which indicates how much the exhaust gas pressure difference has been increased immediately after the end of the ordinary filter regeneration processing due to the PM deposited in the filter 4 in a period of time elapsed from the end of the ordinary filter regeneration processing (hereinafter, referred to simply as an "elapsed period of time").

Then, subsequently in step S207, an amount of increased PM deposition Y2, which is an amount of the PM newly deposited in the upstream side portion 4a in the above-mentioned elapsed period of time, is calculated based on the rate of increase of the exhaust gas pressure difference calculated in step S206. Specifically, the inventor of the subject application has found out that there exists a predetermined correlation shown in FIG. 6 between the rate of increase of the exhaust gas pressure difference calculated in step S206, and the amount of increased PM deposition Y2. This is because the upstream side portion 4a is a location in the filter 4 into which the exhaust gas flows, so the PM newly deposited in the upstream side portion 4a tends to be sensitively reflected on the rate of increase of the exhaust gas pressure difference. Here, note that FIG. 6 shows a control map for calculating the amount of increased PM deposition Y2, wherein the correlation between the rate of increase of the exhaust gas pressure difference and the amount of increased PM deposition Y2 is recorded in the map. After the processing of step S207 ends, the routine goes to step S208.

In step S208, an amount of upstream side PM deposition Y3 is calculated by adding together the amount of residual PM deposition Y1 calculated in step S204 (or the amount of residual PM deposition Y1 calculated in step S204 in the filter upstream regeneration control which has already been carried out, in cases where the processing of step S204 has not been carried out due to the negative determination made in step S202) and the amount of increased PM deposition Y2 calculated in step S207. That is, the amount of upstream side PM deposition Y3 calculated in step S208 is an amount of PM which is estimated to have deposited in the upstream side portion 4a at that point in time, and accordingly, the processings of steps S203 through S208 correspond to processing by a second estimation unit according to the present invention. After the processing of step S208 ends, the routine goes to step S209.

In step S209, it is determined whether the amount of upstream side PM deposition Y3 calculated in step S208 has exceeded a reference amount of PM deposition R3 (corresponding to a third amount of deposition according to the present invention). This reference amount of PM deposition R3 is a threshold value for determining the execution of filter upstream regeneration processing to be described later (processing in step S211) for oxidizing and removing the PM deposited in the upstream side portion 4a by heating from the heater 3. Then, when an affirmative determination is made in step S209, the routine goes to step S210, whereas when a negative determination is made, this control is ended.

In step S210, it is determined whether a start condition for starting filter upstream regeneration processing in step S211 is satisfied. Specifically, as such a start condition, there is mentioned by way of example a case where the flow speed of the exhaust gas in the exhaust passage 2 is equal to or less than a predetermined flow speed which is low to such an extent that the efficient oxidation removal of the deposition PM in the upstream side portion 4a is not obstructed. This is because when the flow speed of the exhaust gas exceeds the predetermined flow speed, heating energy from the heater 3 will flow to the downstream portion side of the filter 4, and it will become difficult to raise the temperature of the upstream side portion 4a in an efficient manner. Here, note that the flow speed of the exhaust gas can be estimated from the detection value of the air flow meter 10 or the engine rotation speed of the internal combustion engine 1. When an affirmative determination is made in step S210, the routine goes to step S211, whereas when a negative determination is made, this control is ended.

Subsequently, in step S211, the filter upstream regeneration processing is started to be carried out. This filter upstream regeneration processing corresponds to processing by a filter upstream regeneration unit according to the present invention. Specifically, electric power is supplied to the heater 3 from an external power supply, so that the upstream side portion 4a of the filter 4 is heated from the upstream end face side thereof. Here, with respect to the heating by the heater 3, the amount of heat to be applied from the heater 3 to the upstream side portion 4a is controlled in such a manner that the temperature of the upstream side portion 4a becomes a fixed or constant oxidation removal temperature. Here, note that since the temperature of the upstream side portion 4a is reflected on the temperature of the filter 4, this heating control is carried out by using the detection value of the temperature sensor 9. Thus, by constantly keeping the temperature of the upstream side portion 4a to the oxidation removal temperature, it is possible to grasp an amount of oxidation removal of the deposition PM per unit time by the filter upstream regeneration processing, by using as parameters this oxidation removal temperature and the period of time of the heating by the heater 3.

Specifically, the amount of oxidation removal of the deposition PM is calculated according to a control map shown in FIG. 7, and the update of the amount of upstream side PM deposition Y3 under the condition that the filter upstream regeneration processing is carried out is made in consideration of the result of the calculation. FIG. 7 is a view showing the correlation among the amount of oxidation removal of the deposition PM, the flow rate of the exhaust gas in the exhaust passage 2, and the amount of heat supply from the heater 3 to the upstream side portion 4*a*. It means that the larger the flow rate of the exhaust gas, the more difficult it becomes to maintain the temperature of the upstream side portion 4*a* at the oxidation removal temperature, and that the larger the amount of heat supply, the lower the temperature of the upstream side portion 4*a* is. Therefore, in the control map shown in FIG. 7, the larger the flow rate of the exhaust gas and the amount of heat supply, the smaller the amount of oxidation removal of the deposition PM per unit time by the filter upstream regeneration processing tends to become. Then, in step S212, the update of the amount of upstream side PM deposition Y3 is carried out, by subtracting the amount of oxidation removal of the deposition PM per unit time calculated according to the control map of FIG. 7 from the amount of upstream side PM deposition Y3 deposited up to that time.

In addition, the amount of oxidation removal of the deposition PM per unit time by the filter upstream regeneration processing calculated in step S212 is also reflected on the amount of filter PM deposition X1 in the ordinary filter regeneration control (see the description about the above-mentioned processing of step S101). According to this, an estimated value of the amount of filter PM deposition X1 will be adjusted by subtraction in accordance with the amount of deposition PM thus oxidized and removed by the filter upstream regeneration processing. After the processing of step S212 ends, the routine goes to step S213.

In step S213, it is determined whether the amount of upstream side PM deposition Y3 updated in step S212 is equal to or less than a reference amount of PM deposition R4 (corresponding to a fourth amount of deposition according to the present invention). This reference amount of PM deposition R4 is a threshold value for determining the end of the filter upstream regeneration processing, and in this embodiment, it is set to zero. When an affirmative determination is made in step S213, the routine goes to step S214, whereas when a negative determination is made, the routine returns to step S212, and the processings in step S212 and onward are repeated again. Then, in step S214, the filter upstream regeneration processing, i.e., the heating control by the heater 3, is ended based on the determination result of S213. Here, note that, at this time, the amount of residual PM deposition Y1 is set to zero. The exhaust gas pressure difference $\Delta P\alpha$ and the amount of residual PM deposition Y1 are used in the filter upstream regeneration control on and after next time, until an affirmative determination is next made in step S202 and the processings of steps S203, S204 are newly carried out.

Here, FIG. 8A shows an example for the change over time of the amount (estimated amount) of PM deposition in the filter 4, and the change over time of the exhaust gas pressure difference (measured value) when the ordinary filter regeneration control shown in FIG. 3 is carried out, and FIG. 8B shows an example for the same changes over time when the filter upstream regeneration control shown in FIG. 4 is carried out. A line L1 in FIG. 8A represents the change over time of the amount of filter PM deposition X1, and a line L2 represents the change over time of the amount of upstream side PM deposition Y3. In addition, R1 through R4 on the axis of ordinate in FIG. 8A correspond to the above-mentioned reference amounts of PM deposition R1 through R4, respectively. Here, note that in the ordinary filter regeneration control, the amount of fuel supply per unit time from the fuel supply valve 5 is set to a fixed amount in a range in which the temperature of the filter 4 becomes the oxidation removal temperature at the time of execution of the ordinary filter regeneration processing. Here, at timings T1, T2 and T3, respectively, at which the amount of filter PM deposition X1 exceeds the reference amount of PM deposition R1, the ordinary filter regeneration processing is carried out. Then, the periods of time for the execution of individual (first, second and third) ordinary filter regeneration processing are indicated by t1, t2 and t3, respectively. At this time, with respect to t1, t2 and t3, the following correlation is satisfied: t1<t2<t3. This is due to the following reason: even if the ordinary filter regeneration processing is carried out, the deposition PM remains in the upstream side portion 4*a* without being oxidized and removed, as mentioned above, and as the amount of the remaining deposition PM increases gradually, the proportion of the oxidation catalyst covered with the deposition PM in the upstream side portion 4*a* increases, thus making it impossible for the oxidation catalyst to exhibit its oxidation ability to a sufficient extent. Here, the increase of the deposition PM in the upstream side portion 4*a* can be understood from the fact that the peak values of the exhaust gas pressure difference at the timings T1, T2 and T3 at which the amount of filter PM deposition X1 exceeds the reference amount of PM deposition R1 become larger in accordance with the lapse of time. Then, the temperature of the filter 4 drops as the oxidation ability thereof in the upstream side portion 4*a* becomes unable to be exhibited to a sufficient extent, and accordingly, the period of time required for the ordinary filter regeneration processing becomes longer.

Accordingly, in FIGS. 8A and 8B, when the amount of upstream side PM deposition Y3 exceeds the reference amount of PM deposition R3 at timing T0, after the third ordinary filter regeneration processing has been carried out, filter upstream regeneration processing will be carried out over a period of time t0. As a result, the PM deposited in the upstream side portion 4*a* will be oxidized and removed by the heating control from the heater 3, and the PM deposition state shown in FIG. 2B will be formed. Here, note that the estimated value of the amount of filter PM deposition X1 is also adjusted to decrease according to the amount of the deposition PM oxidized and removed by carrying out the filter upstream regeneration processing in this period of time W. Also, note that in FIG. 8B, there are plotted by way of example the exhaust gas pressure difference $\Delta P\alpha$ immediately after the end of the ordinary filter regeneration processing carried out at the timing T3 and the exhaust gas pressure difference $\Delta P\beta$ at the time when the filter upstream regeneration processing is started to be carried out at the timing T0.

Then, the estimation of the amount of filter PM deposition X1 and the amount of upstream side PM deposition Y3 is again carried out after the end of the filter upstream regeneration processing, and at the timing T4 at which the amount of filter PM deposition X1 has exceeded the reference amount of PM deposition R1, the ordinary filter regeneration processing will be started to be carried out, wherein an execution period of time t4 of the ordinary filter regeneration processing at this time becomes substantially the same length of time as t1 above, and is shorter than t2 and t3.

Thus, according to the present invention, even if the amount of filter PM deposition X1 is in a state of being larger than the reference amount of PM deposition R2, when the amount of upstream side PM deposition Y3 reaches the reference amount of PM deposition R4 according to the filter upstream regeneration processing, in other words, even if in a state where it can not yet be decided that the filter upstream regeneration processing has ended, when assuming that the ordinary filter regeneration processing has been carried out, the filter upstream regeneration processing is ended. At this time, it is assumed that the PM deposition state shown in FIG. 2B is formed in the filter 4. In this PM deposition state, the oxidation catalyst in the upstream side portion 4a can exhibit its oxidation ability to a sufficient extent, and hence, even if the filter upstream regeneration processing is ended in the state as mentioned above, the deposition PM in the downstream side of the filter 4 can be oxidized and removed in an efficient manner by oxidizing the NO in the exhaust gas into NO2, and in addition, the deposition PM can also be oxidized and removed in an efficient manner similarly by conducting the oxidation reaction heat of the unburnt fuel to be supplied from the fuel supply valve 5 to the downstream side. This can be understood from the fact that the above-mentioned execution period of time t4 is shorter than the execution period of times t2, t3. Accordingly, even if the filter upstream regeneration processing is ended in the state where the amount of filter PM deposition X1 is larger than the reference amount of PM deposition R2, as mentioned above, there will have been formed a condition in which the ordinary filter regeneration processing to be performed later can be carried out in an efficient manner. As a result, the efficient oxidation removal of the deposition PM can be achieved as the exhaust gas purification apparatus for the internal combustion engine 1.

<Modification 1>

In the above-mentioned embodiment, the amount of PM discharged from the internal combustion engine 1 is used in the estimation of the amount of filter PM deposition X1 which is the amount of PM deposited in the filter 4 as a whole. In this first modification, however, in place of this, the amount of filter PM deposition X1 may also be estimated by using the exhaust gas pressure difference detected by the differential pressure sensor 8. Here, in the relation between the amount of filter PM deposition and the exhaust gas pressure difference, there is a tendency that the more the amount of filter PM deposition, the larger the exhaust gas pressure difference becomes, and in addition, there is also another tendency that even if the amount of filter PM deposition is the same, the larger the flow rate of the exhaust gas flowing into the filter 4, the larger the exhaust gas pressure difference becomes. Further, it is known that the flow rate of the exhaust gas in the filter 4 will also be dependent on the temperature of the exhaust gas. Accordingly, at the time of calculating the amount of filter PM deposition X1, the exhaust gas pressure difference is first corrected based on the relation of dependence between the flow rate of the exhaust gas and the temperature of the exhaust gas, so that the amount of filter PM deposition X1 is then estimated. Here, note that an estimation procedure of the amount of filter PM deposition based on the exhaust gas pressure difference is a well-known technique, and so the detailed explanation thereof is omitted.

Here, in the processing of step S101 in the ordinary filter regeneration control shown in FIG. 3, reference is made to the reflection of the regeneration of the upstream side portion in the case where the amount of filter PM deposition X1 is estimated based on the exhaust gas pressure difference. When the amount of filter PM deposition X1 is estimated based on the exhaust gas pressure difference, the amount of PM actually deposited in the filter 4 will be reflected on the estimation. Accordingly, in this case, by estimating the amount of filter PM deposition X1 based on the exhaust gas pressure difference even after the filter upstream regeneration processing has been carried out, the amount of decrease in the amount of upstream side PM deposition Y3 oxidized and removed by the filter upstream regeneration processing will be reflected on the amount of filter PM deposition, in an automatic fashion, i.e., without carrying out the adjustment of decreasing the amount of decrease from the amount of filter PM deposition, as performed in the above-mentioned embodiment.

In addition, in this case, the amount of filter PM deposition X1 and the amount of upstream side PM deposition Y3 will be estimated based on the detection value of the differential pressure sensor 8, and hence, there are not so many opportunities for the amount of upstream side PM deposition Y3 to exceed the amount of filter PM deposition X1 to a large extent, as shown in FIG. 8A. However, this does not obstruct an advantageous effect obtained by the filter upstream regeneration processing being ended even if the amount of filter PM deposition X1 is in the state of being larger than the reference threshold R2, i.e., the achievement of the efficient oxidation removal of the deposition PM as the exhaust gas purification apparatus for the internal combustion engine 1, which is a feature of the invention of the subject application as referred to above.

<Modification 2>

In the above-mentioned embodiment, at the upstream side of the filter 4, there is not arranged an oxidation catalyst device that is formed separately from the filter 4, but in this second modification, such an oxidation catalyst device may be arranged in the exhaust passage 2 at the upstream side of the filter 4, instead of the arrangement of the above-mentioned embodiment. In addition, although in the above-mentioned embodiment, the oxidation catalyst is supported over a range from the upstream side to the downstream side of the substrate of the filter 4, the oxidation catalyst may instead be supported only in the upstream side portion 4a.

Embodiment 2

Reference will be made to an exhaust gas purification apparatus for an internal combustion engine according to a second embodiment of the present invention, based on FIG. 9 and FIGS. 10A and 10B. FIG. 9 is a flow chart for filter upstream regeneration control according to this second embodiment, wherein with respect to those processings which are included in this filter upstream regeneration control, and which are the same as the processings included in the filter upstream regeneration control shown in FIG. 4, the detailed explanation thereof is omitted, by attaching the same reference numerals to the corresponding processings. In this second embodiment, the processing of step S301 is included, in place of the processings of steps S203, S204 included in the filter upstream regeneration control shown in FIG. 4. Accordingly, when an affirmative determination is made in step S202, the processing of step S301 is carried out.

Here, in step S301, the amount of upstream side PM deposition Y3 immediately before the start of execution of ordinary filter regeneration processing, for which a determination has been made in step S202 that it is immediately after the end thereof, is obtained as the amount of residual PM deposition Y1 immediately after the end of this ordinary filter regeneration processing. That is, in this second embodiment, the amount of residual PM deposition Y1 is obtained based on an assumption that the deposition PM in the upstream side portion 4a remains without being oxidized and removed by this ordinary filter regeneration processing. After the processing of step S301 ends, the routine goes to step S205.

Here, the change over time of the amount of PM deposition in the filter 4 in the case of the filter upstream regeneration control shown in FIG. 9 together with the ordinary filter regeneration control shown in FIG. 3 being carried out is shown in FIG. 10A, and the change over time of the amount of PM deposition according to the above-mentioned first embodiment (i.e., the change over time shown in FIG. 8A) is shown in FIG. 10B, for the purpose of reference. Here, note that the mode or way to describe the changes over time shown in FIGS. 10A and 10B is the same as that in FIG. 8A.

In this second embodiment, by the above-mentioned processing of step S301, in the execution periods of time of ordinary filter regeneration processing carried out at timings T1, T2 in FIG. 10A, the amount of upstream side PM deposition Y3 is maintained constant or at the same values (i.e., the values of the amount of upstream side PM deposition Y3 immediately before the start of execution of the ordinary filter regeneration processing). As a result, the amount of upstream side PM deposition Y3 in the second embodiment shown in FIG. 10A will exceed the reference amount of PM deposition R3 at time T0', which is earlier than T0 for the amount of upstream side PM deposition Y3 in the mode shown in the first embodiment (i.e., the amount of upstream side PM deposition Y3 shown by a line L2 in FIG. 10B). In FIGS. 10A and 10B, this early time of arrival to the reference amount of PM deposition R3 is indicated by ΔT. Then, the filter upstream regeneration processing, which has been started to be carried out at the timing T0', is ended at the time when the execution period of time t0' has elapsed, and at this end point in time, the amount of filter PM deposition X1 is in a state of being larger than the reference amount of PM deposition R2, as in the first embodiment.

In this manner, in this second embodiment, the calculation procedure of the amount of upstream side PM deposition Y3 is simplified, and at the same time, the frequency of execution of the filter upstream regeneration processing can be increased or improved. This improvement in the frequency of the execution is just obtained from the result that the amount of upstream side PM deposition Y3 has been estimated under a predetermined assumption, and the frequency of the execution of the filter upstream regeneration processing should not be increased unnecessarily. Thus, according to this second embodiment, the PM deposition state shown in FIG. 2B in the filter 4 can be formed at a relatively high frequency, without unnecessarily increasing the energy consumption in the heating control by the heater 3 to a large extent, and as a result, the efficient oxidation removal of the deposition PM can be achieved as the exhaust gas purification apparatus for the internal combustion engine 1.

Embodiment 3

Reference will be made to an exhaust gas purification apparatus for an internal combustion engine according to a third embodiment of the present invention, based on FIG. 11. FIG. 11 is a flow chart for ordinary filter regeneration control according to this third embodiment, wherein with respect to those processings which are included in this ordinary filter regeneration control, and which are the same as the processings included in the ordinary filter regeneration control shown in FIG. 3, the detailed explanation thereof is omitted, by attaching the same reference numerals to the corresponding processings. In this third embodiment, the processings of steps S401 through S404 are inserted between the processing of step S102 and the processing of S103 included in the ordinary filter regeneration control shown in FIG. 3. Accordingly, when an affirmative determination is made in step S102, the processing of step S401 is carried out.

Here, in step S401, it is determined whether the amount of upstream side PM deposition Y3, which is estimated in the filter upstream regeneration control carried out in parallel, has exceeded the reference amount of PM deposition R3. That is, in step S401, it is determined whether the amount of upstream side PM deposition Y3 further has exceeded the reference amount of PM deposition R3 in a state where the amount of filter PM deposition X1 has exceeded the reference amount of PM deposition R1, or in other words, it is determined whether the execution of each of the ordinary filter regeneration processing and the filter upstream regeneration processing is in a state of being able to be started. When an affirmative determination is made in step S401, i.e., when a determination is made that both of the ordinary filter regeneration processing and the filter upstream regeneration processing are in a state of being able to be carried out, the routine goes to step S402, whereas when a negative determination is made, i.e., when a determination is made that the filter upstream regeneration processing is not in a state of being able to be carried out, the routine goes to step S103.

Then, in step S402, the start of the execution of the ordinary filter regeneration processing is waited or in a standby state. The amount of filter PM deposition X1 is in the state of having exceeded the reference amount of PM deposition R1, as mentioned above, and so, if the start condition in step S103 is satisfied, the ordinary filter regeneration processing is in a state of being able to be carried out. Thus, when the start of the execution of the ordinary filter regeneration processing becomes the standby state, on the other hand, in the filter upstream regeneration control, the amount of upstream side PM deposition Y3 has exceeded the reference amount of PM deposition R3, so that when the execution start condition in step S210 is satisfied, the start of the execution of the filter upstream regeneration processing will be started to be carried out preferentially. Then, in this standby state, the update of the amount of filter PM deposition X1 is carried out in step S403. This update is substantially the same processing as the estimation processing of the amount of filter PM deposition X1 shown in step S101, wherein the value of the amount of filter PM deposition X1 is updated based on the amount of PM discharged from the internal combustion engine 1 during the standby state, and in addition, the value of the amount of filter PM deposition X1 is updated based on the amount of decrease of the deposition PM due to the filter upstream regeneration processing which is preferentially being carried out. After the processing of step S403 ends, the routine goes to step S404.

In step S404, it is determined whether the filter upstream regeneration processing being preferentially carried out has ended. Here, when an affirmative determination is made, the routine returns to step S102, whereas when a negative determination is made, the processings in step S402 and onward are repeated again. Here, note that in the case where the routine returns to step S102, the amount of filter PM deposition X1 for which a determination is made there is the amount of filter PM deposition X1 updated in step S403.

According to this control, in cases where the amount of filter PM deposition X1 is in a state of having exceeded the reference amount of PM deposition R1 and the amount of upstream side PM deposition Y3 is in a state of having exceeded the reference amount of PM deposition R3, the filter upstream regeneration processing will be carried out in preference to the ordinary filter regeneration processing. Thus, the state in which both the ordinary filter regeneration control and the filter upstream regeneration control become able to be carried out may occur to a sufficient extent, depending on the state of satisfaction of the start condition of both these regeneration controls, etc. In such a case, by preferentially carrying out the filter upstream regeneration processing, the PM deposition state shown in FIG. 2B in the filter 4 has been formed, at the time when the ordinary filter regeneration processing is carried out later, as a result of which the efficient oxidation removal of PM can be achieved as the exhaust gas purification apparatus for the internal combustion engine 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-206796, filed on Oct. 7, 2014, which is hereby incorporated by reference herein in its entirety.

REFERENCE SIGNS LIST 1 internal combustion engine
2 exhaust passage
3 heater
4 filter
4a upstream side portion
5 fuel supply valve
7 exhaust gas temperature sensor
8 differential pressure sensor
9 exhaust gas temperature sensor
10 air flow meter
11 crank position sensor
12 accelerator opening sensor
13 intake passage
20 ECU

The invention claimed is:

1. An exhaust gas purification apparatus for an internal combustion engine comprising:
a filter that is arranged in an exhaust passage of the internal combustion engine for trapping particulate matter in exhaust gas, and has an oxidation catalyst supported in at least an upstream side portion of said filter;
a heating device that is arranged so as to be able to heat said upstream side portion of said filter irrespective of oxidation reaction heat of said oxidation catalyst;
a first estimation unit configured to estimate an amount of filter PM deposition which is an amount of deposition of particulate matter deposited in said filter as a whole;
a second estimation unit configured to estimate an amount of upstream side PM deposition which is an amount of deposition of upstream side deposition PM which is particulate matter deposited in said upstream side portion;
an ordinary filter regeneration unit configured to carry out ordinary filter regeneration processing to oxidize and remove the particulate matter until said amount of filter PM deposition is decreased to a second amount of deposition smaller than a first amount of deposition by means of oxidation reaction heat of unburnt fuel generated by said oxidation catalyst supported in said filter, when said amount of filter PM deposition estimated by said first estimation unit exceeds said first amount of deposition; and
a filter upstream regeneration unit configured to carry out filter upstream regeneration processing to oxidize and remove said upstream side deposition PM by controlling said heating device, when said amount of upstream side PM deposition estimated by said second estimation unit exceeds a third amount of deposition;
wherein when said filter upstream regeneration processing is carried out by said filter upstream regeneration unit, an amount of decrease of said upstream side deposition PM by said filter upstream regeneration processing is reflected on said amount of filter PM deposition estimated by said first estimation unit, and even if the thus reflected amount of filter PM deposition is in a state of being larger than said second amount of deposition, said filter upstream regeneration unit ends said filter upstream regeneration processing, when said amount of upstream side PM deposition reaches a fourth amount of deposition smaller than said third amount of deposition.

2. The exhaust gas purification apparatus for an internal combustion engine as set forth in claim 1, wherein
in cases where said amount of filter PM deposition is in a state of having exceeded said first amount of deposition and said amount of upstream side PM deposition is in a state of having exceeded said third amount of deposition, said filter upstream regeneration processing is carried out in preference to said ordinary filter regeneration processing.

3. The exhaust gas purification apparatus for an internal combustion engine as set forth in claim 1, wherein
said second estimation unit includes:
a first calculation unit configured to calculate, based on a first exhaust gas pressure difference which is an exhaust gas pressure difference between an upstream side and a downstream side of said filter at an end time point of said ordinary filter regeneration processing by said ordinary filter regeneration unit, an amount of residual PM deposition which is an amount of PM deposition in said filter at said end time point; and
a second calculation unit configured to calculate, based on a ratio between said first exhaust gas pressure difference and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

4. The exhaust gas purification apparatus for an internal combustion engine as set forth in claim 2, wherein
said second estimation unit includes:
a first calculation unit configured to calculate, based on a first exhaust gas pressure difference which is an exhaust gas pressure difference between an upstream side and a downstream side of said filter at an end time point of said ordinary filter regeneration processing by said ordinary filter regeneration unit, an amount of residual PM deposition which is an amount of PM deposition in said filter at said end time point; and a second calculation unit configured to calculate, based on a ratio between said first exhaust gas pressure difference and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

5. The exhaust gas purification apparatus for an internal combustion engine as set forth in claim 1, wherein
said second estimation unit includes:
a first calculation unit configured to calculate said amount of upstream side PM deposition immediately before the start of said ordinary filter regeneration processing, as an amount of residual PM deposition which is the amount of PM deposition in the filter at the end time point of said ordinary filter regeneration processing, in cases where said ordinary filter regeneration processing is carried out by said ordinary filter regeneration unit; and a second calculation unit configured to calculate, based on a ratio between a first exhaust gas pressure difference which is an exhaust gas pressure difference between an upstream side and a downstream side of said filter at an end time point of said ordinary filter regeneration processing by said ordinary filter regeneration unit and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

6. The exhaust gas purification apparatus for an internal combustion engine as set forth in claim 2, wherein
said second estimation unit includes:
a first calculation unit configured to calculate said amount of upstream side PM deposition immediately before the start of said ordinary filter regeneration processing, as an amount of residual PM deposition which is the amount of PM deposition in the filter at the end time point of said ordinary filter regeneration processing, in cases where said ordinary filter regeneration processing is carried out by said ordinary filter regeneration unit; and a second calculation unit configured to calculate, based on a ratio between a first exhaust gas pressure difference which is an exhaust gas pressure difference between an upstream side and a downstream side of said filter at an end time point of said ordinary filter regeneration processing by said ordinary filter regeneration unit and an amount of increase of the exhaust gas pressure difference between the upstream side and the downstream side of said filter from the end time point of said ordinary filter regeneration processing, an amount of increase of the amount of PM deposition in said upstream side portion of said filter from said end time point, and adds said amount of residual PM deposition to said amount of increase of the amount of PM deposition thus calculated thereby to obtain said amount of upstream side PM deposition.

7. The exhaust gas purification apparatus for an internal combustion engine as set forth in claim 1, wherein
said fourth amount of deposition is zero.

8. The exhaust gas purification apparatus for an internal combustion engine as set forth in claim 2, wherein
said fourth amount of deposition is zero.

* * * * *